(12) United States Patent
Mantell et al.

(10) Patent No.: US 11,338,523 B2
(45) Date of Patent: May 24, 2022

(54) SYSTEM AND METHOD FOR OPERATING A MULTI-NOZZLE EXTRUDER DURING ADDITIVE MANUFACTURING

(71) Applicant: Xerox Corporation, Norwalk, CT (US)

(72) Inventors: David A. Mantell, Rochester, NY (US); Christopher G. Lynn, Wolcott, NY (US); Jason O'Neil, Rochester, NY (US); Priyaanka D. Guggilapu, Webster, NY (US); Peter J. Nystrom, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 132 days.

(21) Appl. No.: 16/898,062

(22) Filed: Jun. 10, 2020

(65) Prior Publication Data
US 2021/0387417 A1 Dec. 16, 2021

(51) Int. Cl.
*B29C 64/393* (2017.01)
*B33Y 30/00* (2015.01)
*B33Y 50/02* (2015.01)
*B29C 64/236* (2017.01)
*B29C 64/241* (2017.01)
*B29C 64/118* (2017.01)
*B29C 64/209* (2017.01)

(52) U.S. Cl.
CPC .......... *B29C 64/393* (2017.08); *B29C 64/236* (2017.08); *B29C 64/241* (2017.08); *B33Y 30/00* (2014.12); *B33Y 50/02* (2014.12); *B29C 64/118* (2017.08); *B29C 64/209* (2017.08)

(58) Field of Classification Search
CPC ... B29C 64/393; B29C 64/118; B29C 64/209; B29C 64/236; B29C 64/241; B33Y 30/00; B33Y 50/02
USPC .......................................................... 264/308
See application file for complete search history.

(56) References Cited

U.S. PATENT DOCUMENTS

| | | | |
|---|---|---|---|
| 6,129,872 A | 10/2000 | Jang | |
| 6,238,613 B1 | 5/2001 | Batchedlder et al. | |
| 6,593,053 B1 | 7/2003 | Chang et al. | |
| 6,773,249 B1 | 8/2004 | Przytulla et al. | |
| 7,604,470 B2 | 10/2009 | LaBossiere et al. | |

(Continued)

FOREIGN PATENT DOCUMENTS

| | | |
|---|---|---|
| EP | 3 575 060 A1 | 12/2019 |
| WO | 2014/200595 A2 | 12/2014 |

(Continued)

OTHER PUBLICATIONS

European Patent Office, Extended European Search Report corresponding to European Patent Application No. 21 175 129.2 (9 pages), dated Oct. 8, 2021, Munich, Germany.

(Continued)

*Primary Examiner* — Joseph S Del Sole
*Assistant Examiner* — Lawrence D. Hohenbrink, Jr.
(74) *Attorney, Agent, or Firm* — Maginot Moore Beck LLP

(57) ABSTRACT

An additive manufacturing system has a controller configured to modify numerical control programming instructions to form interlocking structures that improve object structural integrity in the Z-direction. The interlocking structures are produced by forming one layer with swaths that are separated by gaps and another layer that is formed over the gaps to fill the gaps and lay over the swaths forming the gaps.

20 Claims, 5 Drawing Sheets

(56) References Cited

U.S. PATENT DOCUMENTS

| | | |
|---|---|---|
| 7,765,949 B2 | 8/2010 | Fork et al. |
| 8,801,415 B2 | 8/2014 | Khoshnevis |
| 8,827,684 B1 | 9/2014 | Schumacher et al. |
| 9,757,900 B2 | 9/2017 | Nystrom et al. |
| 9,993,964 B2 | 6/2018 | Mantell |
| 2004/0141018 A1 | 7/2004 | Silverbrook |
| 2004/0164436 A1 | 8/2004 | Khoshnevis |
| 2004/0253365 A1 | 12/2004 | Warren et al. |
| 2014/0039659 A1 | 2/2014 | Boyer et al. |
| 2014/0048969 A1 | 2/2014 | Swanson et al. |
| 2014/0121813 A1 | 5/2014 | Schmehl |
| 2014/0242208 A1 | 8/2014 | Esworthy |
| 2014/0291886 A1 | 10/2014 | Mark et al. |
| 2014/0328964 A1 | 11/2014 | Mark et al. |
| 2014/0363532 A1 | 12/2014 | Wolfgram |
| 2014/0368568 A1 | 12/2014 | Kodama et al. |
| 2015/0035198 A1 | 2/2015 | Saba |
| 2015/0056432 A1 | 2/2015 | Solberg |
| 2015/0077215 A1 | 3/2015 | Ranky et al. |
| 2015/0093468 A1 | 4/2015 | Page |
| 2016/0136897 A1 | 5/2016 | Nielsen-Cole et al. |
| 2016/0325498 A1 | 11/2016 | Gelbert |
| 2016/0346997 A1 | 12/2016 | Lewis et al. |
| 2017/0157828 A1 | 6/2017 | Mandel et al. |
| 2017/0157831 A1 | 6/2017 | Mandel et al. |
| 2017/0157843 A1 | 6/2017 | Nystrom et al. |
| 2017/0157844 A1 | 6/2017 | Mandel et al. |
| 2017/0334137 A1 | 11/2017 | Nystrom et al. |
| 2018/0015674 A1* | 1/2018 | Page .................... B29C 64/336 |
| 2018/0111306 A1 | 4/2018 | Mandel et al. |
| 2018/0111308 A1 | 4/2018 | Mantell et al. |
| 2018/0111336 A1 | 4/2018 | Mantell et al. |
| 2019/0322043 A1* | 10/2019 | Mantell .................. B33Y 10/00 |

FOREIGN PATENT DOCUMENTS

| | | | |
|---|---|---|---|
| WO | 2015027938 A1 | 3/2015 | |
| WO | 2015077262 A1 | 5/2015 | |
| WO | 2020/040719 A1 | 2/2020 | |
| WO | WO-2020040719 A1 * | 2/2020 | ............. B29C 64/10 |

OTHER PUBLICATIONS

3ders.org; New 3-way extruder and color blending nozzle developed for multi-colour/material 3D printing; 3D Printing Technology; Aug. 25, 2012; 11 Pages; www.3ders.org.

Sure Tack Systems; Automatic Adhesive Applicator Equipment; Brochure; 2018; 3 Pages; https://suretacksystems.com/products/automatic-applicators/.

Francis X. Govers III; Diamond Hotend makes multi-color 3D printing possible from a single nozzle; Gizmag; Apr. 12, 2015; 6 Pages; www.gizmag.com.

Sure Tack Systems; HA2 Series Extrusion Hot Melt Applicator; Brochure; 2018; 4 Pages; https://suretacksystems.com/extrusion.

Nscrypt, Inc.; World-wide Leader in Micro to Pico-liter Dispensing Systems with our Patented Micro Dispense Pump; nScrypt, Inc.; 2001-2012; 3 Pages; www.nscrypt.com.

e3d-online.com; Multi-Extrusion; e3d-online; 2014; 6 Pages; www.e3d-online.com/Multi-Extrusion.

Simplify 3D; Printing with Multiple Extruders; Jul. 23, 2015; 5 Pages; www.simplify3d.com/support/tutorials.

Isaac Budmen; Understanding Shells, Layer Height and Infill; Team Budmen; Sep. 2013; 1 Page; www.blog.teambudmen.com.

* cited by examiner

SYSTEM AND METHOD FOR OPERATING A MULTI-NOZZLE EXTRUDER DURING ADDITIVE MANUFACTURING

TECHNICAL FIELD

This disclosure is directed to multi-nozzle extruders used in three-dimensional object printers and, more particularly, to the formation of different structures with such extruders.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use extruders that soften or melt extrusion material, such as ABS plastic, into thermoplastic material and then emit the thermoplastic material in a predetermined pattern. The printer typically operates the extruder to form successive layers of the thermoplastic material that form a three-dimensional printed object with a variety of shapes and structures. After each layer of the three-dimensional printed object is formed, the thermoplastic material cools and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Many existing three-dimensional printers use a single extruder that extrudes material through a single nozzle. The printhead moves in a predetermined path to emit the build material onto selected locations of a support member or previously deposited layers of the three-dimensional printed object based on model data for the three-dimensional printed object. However, using a printhead with only a single nozzle to emit the build material often requires considerable time to form a three-dimensional printed object. Additionally, a printhead with a larger nozzle diameter can form three-dimensional printed objects more quickly but loses the ability to emit build material in finer shapes for higher detailed objects while nozzles with narrower diameters can form finer detailed structures but require more time to build three-dimensional objects.

To address the limitations of single nozzle extruders, multi-nozzle extruders have been developed. In some of these multi-nozzle extruders, the nozzles are formed in a common faceplate and the materials extruded through the nozzles can come from one or more manifolds. In extruders having a single manifold, all of the nozzles extrude the same material, but the fluid path from the manifold to each nozzle can include a valve that is operated to open and close the nozzles selectively. This ability enables the shape of a swath of thermoplastic material extruded from the nozzles to be varied by changing the number of nozzles extruding material and selecting which nozzles are extruding material. In extruders having different manifolds, each nozzle can extrude a different material with the fluid path from one of the manifolds to its corresponding nozzle including a valve that can be operated to open and close the nozzle selectively. This ability enables the composition of the material in a swath to vary as well as the shape of the swath of thermoplastic material extruded from the nozzles. Again, these variations are achieved by changing the number of nozzles extruding material and selecting which nozzles extrude material. These multi-nozzle extruders enable different materials to be extruded from different nozzles and can be used to form an object without having to coordinate the movement of different extruder bodies. These different materials can enhance the ability of the additive manufacturing system to produce objects with different colors, physical properties, and configurations. Additionally, by changing the number of nozzles extruding material, the size of the swaths produced can be altered to provide narrow swaths in areas where precise feature formation is required, such as object edges, and to provide broader swaths to quickly form some areas of an object, such as its interior regions.

One challenge in the production of objects using extrusion 3D printing is the lack of strength in the adherence between layers in the Z-direction that occurs sometimes. Poor adhesion between layers limits the usefulness of the printed parts. Although the strength of adherence within a layer can be enhanced by forming extrusions in the layer orthogonally to one another, this type of structure cannot be achieved in the vertical or Z-direction. Improving layer adherence in the Z-direction for 3D printed objects would be beneficial.

SUMMARY

A new additive manufacturing apparatus forms interlocking structures between object layers in the Z-direction to improve the structural integrity of the object being formed. The apparatus includes a platform configured to support an object during manufacturing, an extruder having a plurality of nozzles, at least one actuator operatively connected to the extruder, the at least one actuator being configured to move the extruder in an X-Y plane parallel with the platform, to rotate the extruder about an axis perpendicular to the X-Y plane, and to change a distance between the extruder and the platform along the axis perpendicular to the X-Y plane, and a controller operatively connected to the extruder and the at least one actuator. The controller is configured to receive horizontal slice data for an object and numerical control programming instructions for forming the object, and modifying the numerical control programming instructions to form interlocking swaths in adjacent layers with the object during object formation.

A method of operating the new additive manufacturing system forms interlocking structures between object layers in the Z-direction to improve the structural integrity of the object being formed. The method includes receiving with a controller horizontal slice data for an object and numerical control programming instructions for forming the object, modifying the numerical control programming instructions with the controller to provide interlocking swaths in adjacent layers of the object, operating with the controller at least one actuator operatively connected to an extruder having a plurality of nozzles using the modified numerical control programming instructions to move the extruder in an X-Y plane that is parallel with a platform, to rotate the extruder about an axis perpendicular to the X-Y plane, and to change a distance between the extruder and the platform along the axis perpendicular to the X-Y plane, and operating the extruder with the controller using the modified numerical control programming instructions to form the interlocking swaths in the adjacent layers of the object during formation of the object on the platform.

BRIEF DESCRIPTION OF THE DRAWINGS

The foregoing aspects and other features of an additive manufacturing apparatus that alternates the formation of object layers in the Z-direction to form interlocking structures that improve the object integrity along the Z-axis of the object are explained in the following description, taken in connection with the accompanying drawings.

DETAILED DESCRIPTION

Figure 1:
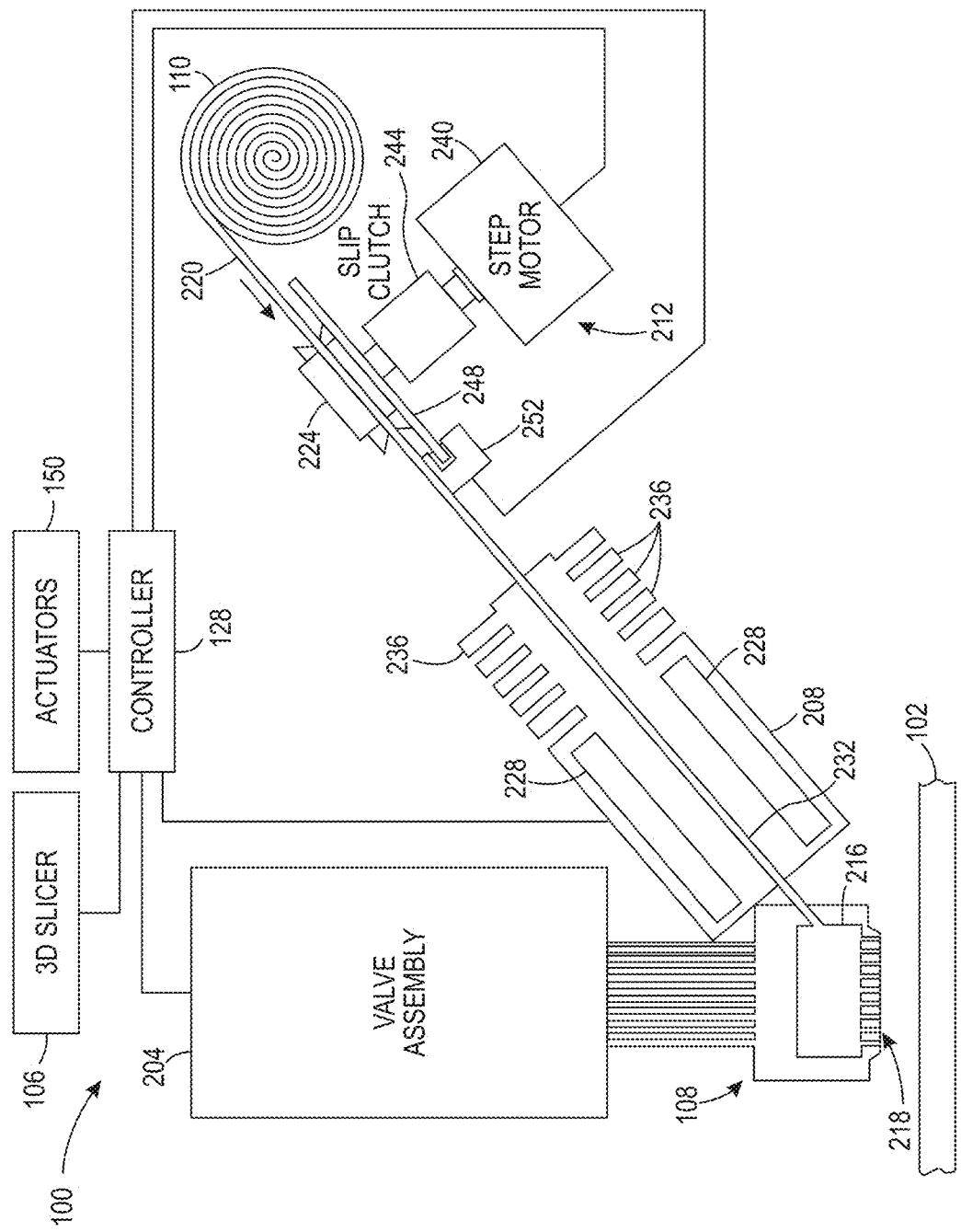
FIG. 1 depicts an additive manufacturing apparatus that alternates the formation of object layers in the Z-direction to improve the object integrity along the Z-axis of the object.

For a general understanding of the environment for the device disclosed herein as well as the details for the device, reference is made to the drawings. In the drawings, like reference numerals designate like elements.

As used herein, the term "extrusion material" refers to a solid material that is softened or melted to form thermoplastic material to be emitted by an extruder in an additive manufacturing system. The extrusion materials include, but are not strictly limited to, both "build materials" that form permanent portions of the three-dimensional printed object and "support materials" that form temporary structures to support portions of the build material during a printing process and are then optionally removed after completion of the printing process. Examples of build materials include, but are not limited to, acrylonitrile butadiene styrene (ABS) plastic, polylactic acid (PLA), aliphatic or semi-aromatic polyamides (Nylon), plastics that include suspended carbon fiber or other aggregate materials, electrically conductive polymers, and any other form of material that can be thermally treated to produce thermoplastic material suitable for emission through an extruder. Examples of support materials include, but are not limited to, high-impact polystyrene (HIPS), polyvinyl acetate (PVA), and other materials capable of extrusion after being thermally treated. In some extrusion printers, the solid extrusion material is supplied as continuous elongated length of material commonly known as a "filament." This filament is provided in a solid form by one or more rollers pulling the extrusion material filament from a spool or other supply and feeding the filament into a heater that is fluidly connected to a manifold within the extruder. Although the illustrated examples use extrusion material that is supplied as filament to the heaters, other extrusion material supplies can be used, such as particulate or spherical ball solid extrusion materials. The heater softens or melts the extrusion material filament to form a thermoplastic material that flows into the manifold. When a valve positioned between a nozzle and the manifold is opened, a portion of the thermoplastic material flows from the manifold through the nozzle and is emitted as a stream of thermoplastic material. As used herein, the term "melt" as applied to solid extrusion material refers to any elevation of temperature for the solid extrusion material that softens or changes the phase of the extrusion material to enable extrusion of the resulting thermoplastic material through one or more nozzles in an extruder during operation of a three-dimensional object printer. As used in this document, the term "thermoplastic material" means solid extrusion material that has been melted. As those of skill in the art recognize, certain amorphous extrusion materials do not transition to a pure liquid state during operation of the printer.

As used herein, the term "extruder" refers to a component of a printer that melts solid extrusion material in a single fluid chamber and provides the melted extrusion material to a manifold connected to one or more nozzles. Some extruders include a valve assembly that can be electronically operated to enable thermoplastic material to flow through nozzles selectively. The valve assembly enables two or more nozzles to be connected to the manifold independently to extrude the thermoplastic material through the connected nozzles. As used herein, the term "nozzle" refers to an orifice in a faceplate of an extruder that is fluidly connected to the manifold in an extruder and through which thermoplastic material is emitted towards a material receiving surface. During operation, the nozzle can extrude a substantially continuous linear swath of the thermoplastic material along a path as the extruder is moved in a process direction. A controller operates the valves in the valve assembly to control which nozzles are connected to the valve assembly to extrude thermoplastic material. The diameter of the nozzle affects the width of the line of extruded thermoplastic material. Different extruder embodiments include nozzles having a range of orifice sizes with wider orifices producing lines having widths that are greater than the widths of lines produced by narrower orifices.

As used herein, the term "manifold" refers to a cavity formed within a housing of an extruder that holds a supply of thermoplastic material for delivery to one or more nozzles in the extruder during a three-dimensional object printing operation. As used herein, the term "swath" refers to any pattern of the extrusion material that the extruder forms on a material receiving surface during a three-dimensional object printing operation. Common swaths include straight-line linear arrangements of extrusion material and curved swaths. In some configurations, the extruder extrudes the thermoplastic material in a continuous manner to form the swath with a contiguous mass of the extrusion material in both process and cross-process directions, while in other configurations the extruder operates in an intermittent manner to form smaller groups of thermoplastic material that are arranged along a linear or curved path. The three-dimensional object printer forms various structures using combinations of different swaths of the extrusion material. Additionally, a controller in the three-dimensional object printer uses object image data and extruder path data that correspond to different swaths of extrusion material prior to operating the extruder to form each swath of extrusion material. As described below, the controller optionally adjusts the operation of the valve assembly and the rotation of the extruder to form multiple swaths of thermoplastic material through one or more nozzles during a three-dimensional printing operation.

As used herein, the term "process direction" refers to a direction of a straight-line motion path between an extruder and a material receiving surface that receives thermoplastic material extruded from one or more nozzles in the extruder. For a curved swath, a tangent line to the curve identifies the process direction. The material receiving surface is either a support member that holds a three-dimensional printed object or a surface of the partially formed three-dimensional object during an additive manufacturing process. In the illustrative embodiments described herein, one or more actuators move the extruder about the support member, but alternative system embodiments move the support member to produce the relative motion in the process direction while the extruder remains stationary. Some systems use a combination of both systems for different axes of motion.

As used herein, the term "cross process direction" refers to an axis that is perpendicular to the process direction and parallel to the extruder faceplate and the material receiving surface. The process direction and cross-process direction refer to the relative path of movement of the extruder and the surface that receives the thermoplastic material. In some configurations, the extruder includes an array of nozzles that can extend in the process direction, the cross-process direction, or both. Adjacent nozzles within the extruder are separated by a predetermined distance in the cross-process direction. In some configurations, the system rotates the extruder to adjust the effective cross-process direction distance that separates different nozzles in the extruder to change the corresponding cross-process direction distance that separates the lines of thermoplastic material that are extruded from the nozzles in the extruder as the lines form a swath.

During operation of the additive manufacturing system, an extruder moves in the process direction along both straight and curved paths relative to a surface that receives thermoplastic material during the three-dimensional object printing process. Additionally, an actuator in the system optionally rotates the extruder about the Z-axis to adjust the effective cross-process distance that separates nozzles in the extruder so the extruder forms two or more lines of thermoplastic material with predetermined distances between each line of the thermoplastic material. As used in this document, the term "Z-direction" refers to a direction of movement that is perpendicular to the plane in which the process direction and cross-process direction are orthogonal to one another, which is sometimes called the X-Y plane in this document. The extruder moves both along the outer perimeter to form outer walls of a two-dimensional region in a layer of the printed object and within the perimeter to fill all or a portion of the two-dimensional region with the thermoplastic material.

FIG. 1 depicts an additive manufacturing system 100 having an extruder 108 that extrudes thermoplastic material through nozzles in a faceplate to form interlocking structures between layers in the Z-direction as described in more detail below. Although the printer 100 is depicted as a printer that uses planar motion to form an object, other printer architectures can be used with the extruder and the controller configured to regulate the rotation of the extruder as described in this document. These architectures include delta-bots, selective compliance assembly robot arms (SCARAs), multi-axis printers, non-Cartesian printers, and the like. The motions in these alternative embodiments still have process and cross-process directions as defined above and the nozzle spacing in the extruders of these embodiments still define the nozzle spacing with respect to the cross-process direction. Only one manifold 216 is shown in FIG. 1 to simplify the figure, but the extruder 108 can have a plurality of manifolds 216. In one embodiment, each manifold 216 in the extruder 108 is operatively connected to a different heater 208 that is fed by a different extrusion material supply 110 in a one-to-one correspondence. Alternatively, each manifold 216 can be coupled to a single heater 208 that houses a plurality of channels 232 that are fed by a plurality of extrusion material supplies 110 as is known. Each channel in such an embodiment supplies thermoplastic material to a manifold in the extruder 108 so each manifold receives a material that is different than a material that the other manifolds are receiving. In the extruder 108 of FIG. 1, each nozzle 218 is fluidly connected to the single manifold within the extruder 108 so each nozzle extrudes the same thermoplastic material. In an embodiment having a plurality of manifolds supplied by different heaters, groups of nozzles are fluidly connected to different manifolds so the groups are able to extrude different thermoplastic material than the thermoplastic material extruded from the other groups of nozzles connected to other manifolds. Extrusion of thermoplastic material from each nozzle is selectively and independently activated and deactivated by controller 128 operating the valves in the valve assembly 204. Each nozzle 218 terminates at a faceplate 260 so the thermoplastic material extruded from the nozzles can be manipulated by the faceplate for spreading.

In the embodiment of FIG. 1, a valve assembly 204 positions a valve between the manifold in the extruder 108 and each of the nozzles connected to the manifold in the extruder 108. The valve assembly 204 is operatively connected to the controller 128 so the controller can operate actuators to open and close the valves for extruding thermoplastic material from the plurality of nozzles in the extruder 108. Specifically, the controller 128 activates and deactivates different actuators in the assembly 204 connected to the valves in the extruder 108 to extrude thermoplastic material from the nozzles and form swaths of different thermoplastic materials in each layer of a three-dimensional printed object.

The system 100 of FIG. 1 also includes an extrusion material dispensing system 212 for the heater 208 that is connected to the manifold in the extruder 108. The extrusion material from the separate supply 110 is fed to the heater 208 at a rate that maintains the pressure of the thermoplastic material in the manifold connected to the heater within a predetermined range during operation of the system 100. The dispensing system 212 is one embodiment that is suitable for regulating pressure of the thermoplastic material in the manifold of the extruder 108. In the alternative embodiment previously discussed, a plurality of extrusion material dispensing systems 212 are operatively connected between a plurality of extrusion material supplies 110 and one of the channels 232 in the heater 208 in a one-to-one correspondence. Additionally, in both embodiments, the controller 128 is operatively connected to an actuator for each dispensing system 212 to control the rate at which the dispensing system 212 delivers solid extrusion material from a supply 110 to the heater fed by the supply. The heater 208 softens or melts the extrusion material 220 fed to the heater 208 via drive roller 224. Actuator 240 drives the roller 224 and is operatively connected to the controller 128 so the controller can regulate the speed at which the actuator drives the roller 224. Another roller opposite roller 224 is freewheeling so it follows the rate of rotation at which roller 224 is driven. While FIG. 1 depicts a feed system that uses an electromechanical actuator and the driver roller 224 as a mechanical mover to move the filament 220 into the heater 208, alternative embodiments of the dispensing system 212 use one or more actuators to operate a mechanical mover in the form of a rotating auger or screw. The auger or screw moves solid extrusion material from a supply 110 in the form of extrusion material powder or pellets into a heater 208.

In the embodiment of FIG. 1, the heater has a body formed from stainless steel that includes one or more heating elements 228, such as electrically resistive heating elements, which are operatively connected to the controller 128. Controller 128 is configured to connect the heating elements 228 to electrical current selectively to soften or melt the filament of extrusion material 220 in the channel or channels within the heater 208. While FIG. 1 shows the heater 208 receiving extrusion material in a solid phase as solid filament 220, in alternative embodiments, the heater can receive the extrusion material in solid phase as powdered or pelletized extrusion material. Cooling fins 236 attenuate heat in the channels upstream from the heater. A portion of the extrusion material that remains solid in a channel at or near the cooling fins 236 forms a seal in the channel that prevents thermoplastic material from exiting the heater from any opening other than the connection to the manifold 216, which maintains a temperature that keeps the extrusion material in a thermoplastic state as it enters the manifold. The extruder 108 can also include additional heating elements to maintain an elevated temperature for the thermoplastic material within the manifold within the extruder. In some embodiments, a thermal insulator covers portions of the exterior of the extruder 108 to maintain a temperature within the manifold of the extruder. Also, the regions around the nozzles are maintained at a temperature that keeps the material in a thermoplastic state so it does not begin solidifying as it travels to the apertures in the faceplate.

To maintain a fluid pressure of the thermoplastic material within the manifold 216 within a predetermined range, avoid damage to the extrusion material, and control the extrusion rate through the nozzles, a slip clutch 244 is operatively connected to the drive shaft of each actuator 240 that feeds filament from a supply 110 to a heater. As used in this document, the term "slip clutch" refers to a device that applies frictional force to an object to move the object up to a predetermined level, which is known as a set point. When a range about the predetermined set point for the frictional force is exceeded, the device slips so it no longer applies the frictional force to the object. The slip clutch enables the force exerted on the filament 220 by the roller 224 to remain within the range about the set point, which corresponds to the strength of the filament, no matter how frequently, how fast, or how long the actuator 240 is driven. This near constant force can be maintained by either driving the actuator 240 at a speed that is higher than the fastest expected rotational speed of the filament drive roller 224 or by putting an encoder wheel 248 on the roller 224 and sensing the rate of rotation with a sensor 252. The signal generated by the sensor 252 indicates the angular rotation of the roller 224 and the controller 128 receives this signal to identify the speed of the roller 224. The controller 128 is further configured to adjust the signal provided to the actuator 240 to control the speed of the actuator. When the controller is configured to control the speed of the actuator 240, the controller 128 operates the actuator 240 so its average speed is slightly faster than the rotation of the roller 224. This operation ensures that the torque on the drive roller 224 is always a function of the slip clutch torque.

The controller 128 has a set point stored in memory connected to the controller that identifies the slightly higher speed of the actuator output shaft over the rotational speed of the roller 224. As used in this document, the term "set point" means a parameter value that a controller uses to operate components to keep the parameter corresponding to the set point within a predetermined range about the set point. For example, the controller 128 changes a signal that operates the actuator 240 to rotate the output shaft at a speed identified by the output signal in a predetermined range about the set point. In addition to the commanded speed for the actuator, the number of valves opened or closed in the valve assembly 204 and the torque set point for the clutch also affect the filament drive system 212 operation. The resulting rotational speed of the roller 224 is identified by the signal generated by the sensor 252. A proportional-integral-derivative (PID) controller within controller 128 identifies an error from this signal with reference to the differential set point stored in memory and adjusts the signal output by the controller to operate the actuator 240. Alternatively, the controller 128 can alter the torque level for the slip clutch or the controller 128 can both alter the torque level and adjust the signal with which the controller operates the actuator.

The slip clutch 244 can be a fixed or adjustable torque friction disc clutch, a magnetic particle clutch, a magnetic hysteresis clutch, a ferro-fluid clutch, an air pressure clutch, or permanent magnetic clutch. The clutch types that operate magnetically can have their torque set points adjusted by applying a voltage to the clutches. This feature enables the torque set point on the clutch to be changed with reference to print conditions. The term "print conditions" refers to parameters of the currently ongoing manufacturing operation that affect the amount of thermoplastic material required in the manifold for adequate formation of the object. These print conditions include the type of extrusion material being fed to the extruder, the temperature of the thermoplastic material being emitted from the extruder, the speed at which the extruder is being moved in the X-Y plane, the position of the feature being formed on the object, the angle at which the extruder is being moved relative to the platform, and the like.

In the embodiment shown in FIG. 1, the controller 128 is configured to transmit one or more signals to the actuators 150 to operate the actuators to move the extruder 108 parallel to the X-Y plane opposite the faceplate of the extruder and rotate the extruder 108 about its Z-axis, which is perpendicular to the X-Y plane of a build platform opposite the faceplate 260 and through the center nozzle of the faceplate. As used in this document, the term "configured" when used with regard to a controller means programmed instructions stored in a memory accessible by the controller that are executed by the controller to perform a function by processing data and operating one or more components operatively connected to the controller. In order to control the extruder and the actuators 150, the programmed instructions, in one embodiment called gcode, include parameters for movement in X, Y, and Z axes, operation of the valves, and rotation of the extruder about the Z-axis. For example, a gcode instruction takes the form of: G1 P511 X10.0 Y12.5 Z0.2 U180, which means that the controller opens and closes the valves to conform to the pattern corresponding to 511, which corresponds to the binary value 111111111 so all of the nozzles are opened, moves the extruder in the X, Y, and Z axes to the coordinates 10.0, 12.5, 0.2, and rotates the extruder to the 180 degree position about the Z-axis.

The gcode or other numerical control (NC) language that the controller executes to operate the system 100 is obtained from a 3D slicer. A 3D slicer receives from an object data source, which is typically a computer aided design or CAD system, data that corresponds to the surface of the object to be formed. A common format for object surface data from such sources is STL data. The 3D slicer then generates 3D horizontal slices of the object, which also includes data corresponding to the interior of an object, from the object surface data and the gcode necessary to form the slices. In the system 100, a new 3D slicer 106 generates the horizontal slices with features that enhance the interlocking of object layers in the Z-direction as explained more fully below. Alternatively, the controller 128 can be configured with programmed instructions that, when executed by the controller, causes the controller to modify gcode received from a known 3D slicer to incorporate Z-direction interlocking features in the horizontal slices.

Between the formation of object layers, the controller 128 also operates a Z-axis actuator in the actuators 150 to move the extruder 108 or the platform 102 in the Z-direction so the extruder 108 can form another layer on top of a previously formed layer. In the system 100, this Z-direction distance is a distance sufficient to form the next layer with a thickness corresponding to the horizontal slice data for the layer. Additionally, because the extruder 108 is a multi-nozzle extruder, the extruder can be oriented so as the extruder is moved in the X-Y plane, the thermoplastic material emitted by the nozzles contact one another in the cross-process direction to form ribbons of emitted thermoplastic material rather than beads. These ribbons enhance the surface area contact between adjacent ribbons of material in the X-Y plane and aid in the filling of features that improve the structural integrity of the object in the Z-direction.

Figure 2:
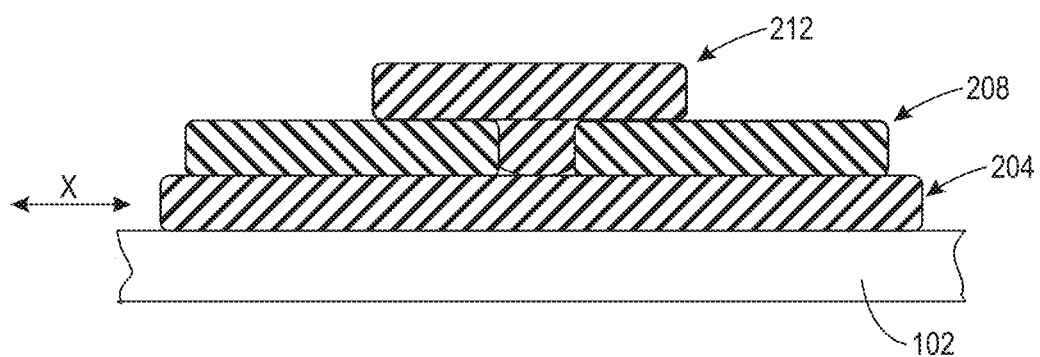
FIG. 2 is a side view of one type of interlocking structure that improves object integrity along the Z-axis.

One example of a feature that improves the structural integrity of an object in the Z-direction is shown in FIG. 2. The bottom layer is a solid layer 204 on the platform 102 that has been printed by moving the extruder across the platform, which in this example is called the X direction. After the layer is formed and the controller operates the Z-axis actuator to adjust the vertical distance between the extruder and the most recently formed layer, the next layer 208 is formed with swaths that are formed by moving the extruder into and out of the plane shown in the figure, which is called the Y direction in this example. In one embodiment, each swath is nominally 3.6 mm wide and a gap is left between them. Again, after moving the extruder or the platform in the Z-direction, the next layer 212 is formed with a swath that is formed over the gap. This swath is formed with extra thermoplastic material that not only covers the swaths of the previous layer but that also enters into the gap between adjacent swaths in the previous layer and fills it. This additional thermoplastic material amount forms an interlocking structure between the layer currently being formed and the previously formed layer. The additional thermoplastic material is provided by either slowing down the movement of the extruder along the gap so the additional material fills the gap before forming the cross-member of the T-shape or by increasing the rate of the solid extrusion material feed into the heater. The interlocking structure significantly increases the area of bonding between the layers. This increased area of layer bonding improves vertical structural integrity of the object in three ways. For one, the surface area of contact between the most recently formed layer and the immediately previously formed layer is increased significantly. For another, the amount of material deposited is greater and this thermoplastic material adds more heat to the interface to aid bonding in the gap region. Finally, the direction of the bond between the layers is now stronger in the X-Y plane than when it is formed by only distributing material on the surface of the previously formed layer. Because the multi-nozzle extruder is able to form ribbons of material, it promotes adherence of the layers more than separated beads printed in a multi-pass process. The direction of a gap in a layer and the direction of extruder movement as the extruder fills the gap should be aligned. When the extruder is moved perpendicular to the direction of the gap, the emitted material does not fill the gap as well and the bonding between the layers is weaker than when the extruder is aligned with the gap direction.

In this document, the term "interlocking swaths" means swaths in one layer that are formed with gaps between the swaths and swaths in the next layer that fill the gaps and cover at least a portion of the swaths that form the gaps. Most commonly, a gap is produced by leaving a space between a pair of swaths in one layer and this gap is filled by a swath in the next layer that is formed by moving the extruder in the same direction as it was moved when the swaths and gap left in the previous layer were formed. Typically, many interlocking swaths are arranged within a layer and the following layer. Interlocking swaths can also be made between a next layer and a layer subsequent to the next layer. Gaps in regions are placed above areas in an underlying layer without gaps so the gaps in the different layers are staggered with respect to one another. The number of layers with interlocking swaths formed by moving the extruder in the same direction can be any number but keeping this number to a relatively small number of layers, such as two to four layers, enables the extruder to be moved in a different direction for infill areas in the layers. This constraint enables the formation of interlocking swaths that are perpendicular to the first group of interlocking swaths in the X-Y plane. By alternating the direction of the interlocking swaths, additional structural integrity is obtained.

Figure 3:
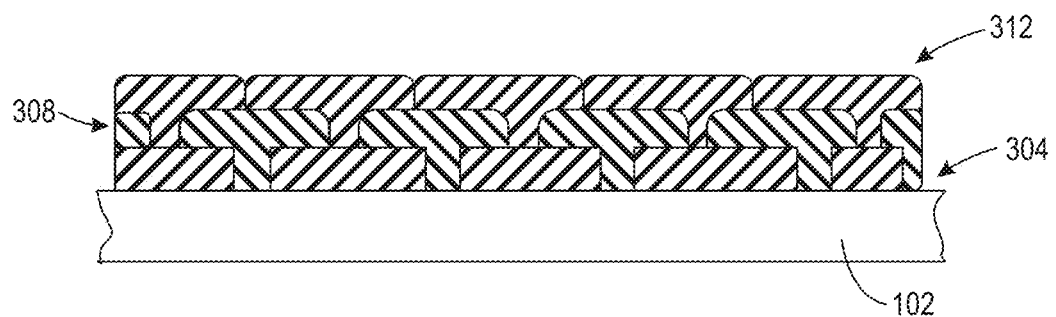
FIG. 3 is a side view of another type of interlocking structure that improves object integrity along the Z-axis.

With reference to FIG. 3, the bottom two layers 304 and 308 show four interlocking swaths and a solid layer 312 overlying these interlocking swaths. As used in this document, the term "solid layer" means a layer formed with swaths that are contiguous in the process and cross-process directions so no open spaces or gaps exist in the layer. The solid layer helps form a foundation for a next group of interlocking layers in the direction perpendicular to the interlocking swaths shown in FIG. 3. During formation of an object, the greatest efficiency is achieved by operating the extruder with all of the nozzles open to form the widest swaths possible. When a solid top layer is to be formed, however, a mismatch can occur between the layer containing the gaps and the solid layer as shown in FIG. 3. To address this situation, the gaps are filled with swaths formed by the nozzles in the middle of the extruder rather than from those at the edges of the extruder so the edges of the swaths that fill the gaps avoid aligning with the edges of the swaths that form the gaps.

In one example of an embodiment having a nine-nozzle extruder, the swaths forming the gaps are formed with eight of the nine nozzles open. This operation leaves a gap of 0.4 mm between the swaths since the nozzles have a diameter of 0.2 mm. Thus, each swath has a width of 3.2 mm and the manifold of the extruder was fed with filament at a rate of 8/9 of the normal filament rate. The gap-filling swaths were formed with all nine nozzles open and the manifold fed at a rate of 10/9 of the normal filament rate to provide a swath having a 3.6 mm width and the additional thermoplastic material necessary to fill a gap.

In order for the interlocking swaths to be effective, the material filling the gap needs to maintain a temperature sufficient to provide material flow in the gap. This condition can be met in a number of ways. For one, an external heater can apply heat to the platform on which the part is being made to ensure the part temperature does not promote material freezing before the gap is filled. Also, an external heater can be positioned to direct heat toward the surface of the layer having the gaps to maintain an adequate temperature for thermoplastic material flow into the gaps. The heater of the extruder can also be operated to raise the temperature of the material emitted by the nozzles of extruder to a level that makes the flow of the material adequate for gap filling. The choice of materials used in the system can also provide adequate flow for the emitted material to fill the gaps. In particular, semi-crystalline materials, such as nylon, PEEK, PEKK, or TPU, are useful since they take more time for solidification than amorphous transition materials.

Figure 4:
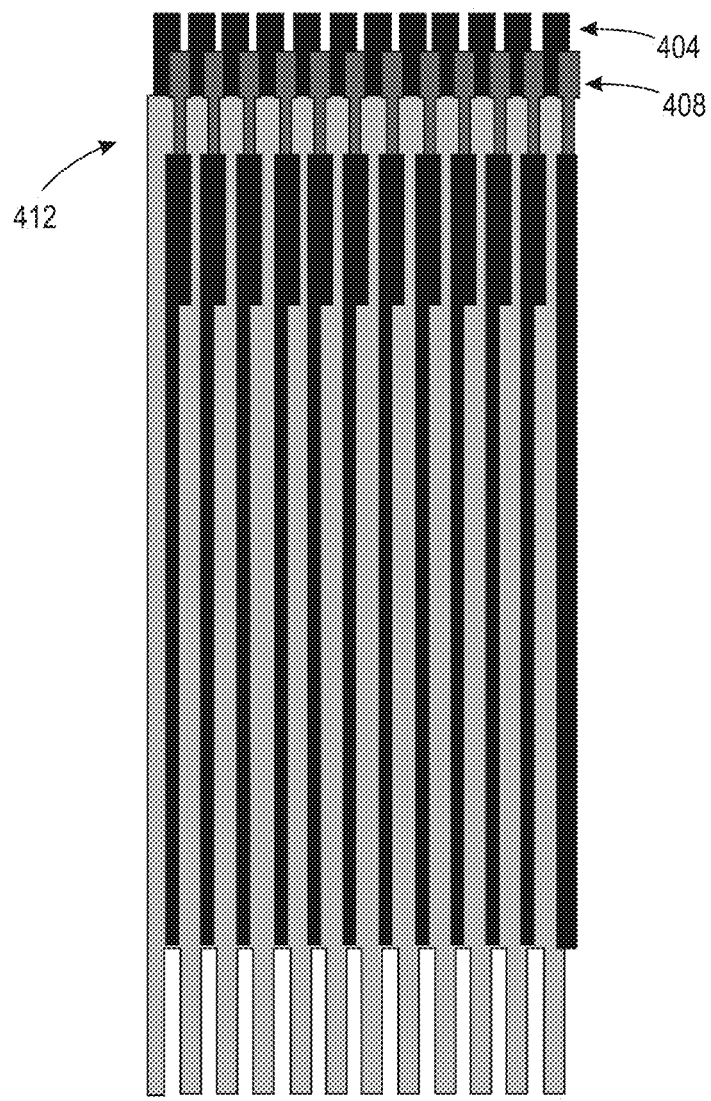
FIG. 4 is a top view of an offset and interlocking structure that improves object integrity along the Z-axis.

Another approach is to form many interlocking layers with the swaths of each layer being formed in the same direction. As shown in FIG. 4, the swaths of each layer 404, 408, and 412 are formed by bidirectionally moving the extruder and the swaths of one layer fill the gaps of the previous layer while also forming gaps over the solid swath layers of that same previous layer. The top of this structure is then capped with a solid layer (not shown).

Figure 5:
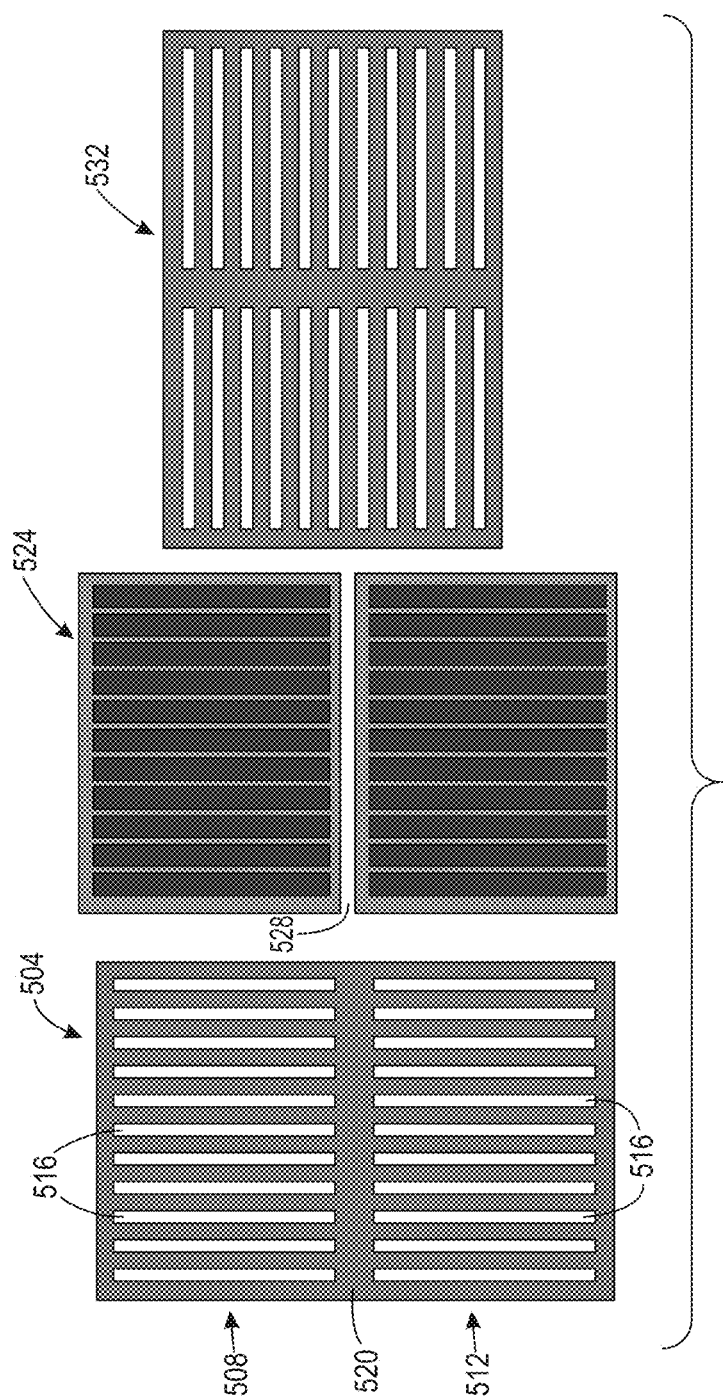
FIG. 5 is a top view of another type of interlocking structure that alternates direction in the XY plane to improve object integrity along the Z-axis.

Zones of interlocking swaths can also be used to enhance structural integrity as shown in FIG. 5. The lower layer is layer 504. This layer has two zones 508 and 512 that have gaps 516 formed in the same direction and these zones are separated by a solid swath 520. This layer is covered by a layer 524 that is solid over the two zones but layer 524 has a gap 528 in it that extends in a direction that is perpendicular to the direction of the gaps in layer 504. When layer 524 overlays layer 504, the gap 528 has a floor that is provided by the solid swath 520. Layer 532 is layer 504 rotated ninety degrees. When this layer is formed over the combination of layer 504 and layer 524, one of the solid swaths in layer 532 fills the gap in layer 524 and provides gaps 536 for another layer that is like layer 524 except rotated ninety degrees. This alternating pattern can continue until a solid capping layer completes the interlocking structure.

Figure 6:
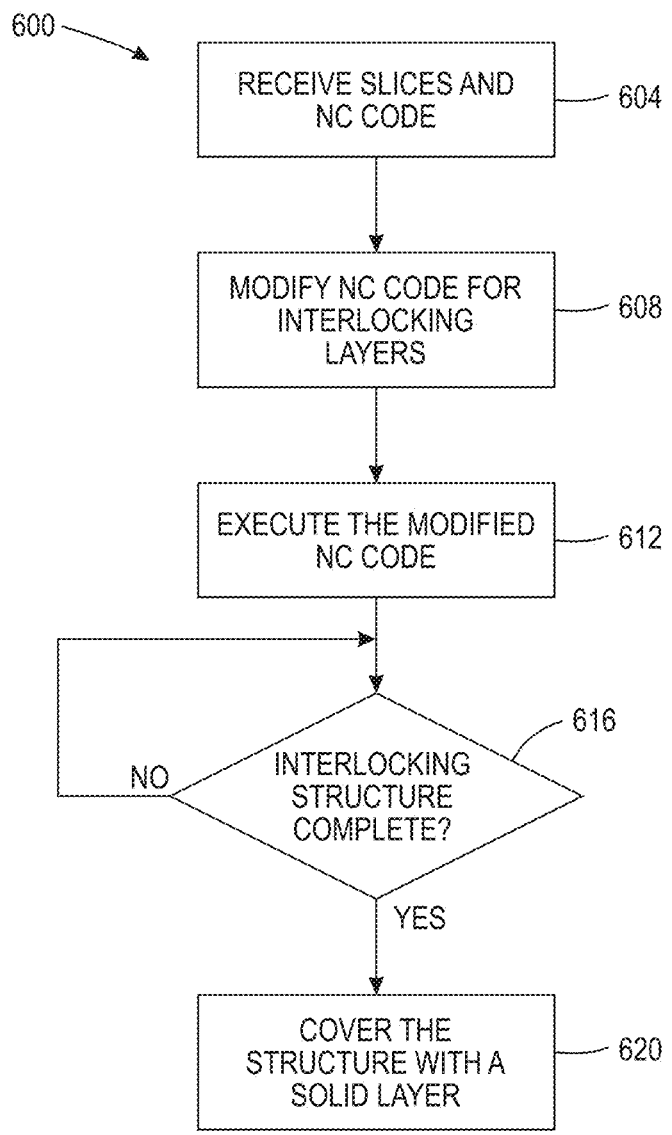
FIG. 6 is a flow diagram of a process for operating the system of FIG. 1.

A process for operating an extruder to form interlocking structures is shown in FIG. 6. The process is performed by a controller executing programmed instructions stored in a memory operatively connected to the controller and when the controller executes the instructions it processes data and operates components operatively connected to the controller to form the tasks set forth in the flow diagram of the process.

The process 600 begins by receiving the horizontal slices and gcode from a 3D slicer (block 604). The controller then identifies the slices that are to be modified to incorporate interlocking structures and modifies the gcode for those slices to either form gaps in the corresponding layers or to fill gaps in previously formed layers (block 608). The controller executes the gcode to operate the actuators and the extruder to form the interlocking layers (block 612) and when an interlocking structure is completed (block 616), the controller operates the extruder to form a solid layer (block 620).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. An apparatus comprising:
a platform configured to support an object during manufacturing;
an extruder having a plurality of nozzles;
at least one actuator operatively connected to the extruder, the at least one actuator being configured to move the extruder in an X-Y plane parallel with the platform, to rotate the extruder about an axis perpendicular to the X-Y plane, and to change a distance between the extruder and the platform along the axis perpendicular to the X-Y plane; and
a controller operatively connected to the extruder and the at least one actuator, the controller being configured to:
receive horizontal slice data for the object to be supported by the platform during manufacturing and numerical control programming instructions for forming the object; and
modifying the numerical control programming instructions to form interlocking swaths in adjacent layers with the object during object formation.

2. The apparatus of claim 1, the controller being further configured to:
modify the numerical control programming instructions to operate the at least one actuator to move the extruder in the X-Y plane and operate the extruder while the extruder is being moved in the X-Y plane to form a first layer with a plurality of swaths in which adjacent swaths are separated by a gap and to form a second layer with a plurality of swaths, each swath in the plurality of swaths in the second layer extends in a same direction as the gap between adjacent swaths in the first layer and each swath in the plurality of swaths in the second layer both fills the gap separating the adjacent swaths in the first layer and overlies a portion of each portion of the adjacent swaths forming the gap.

3. The apparatus of claim 2, the controller being further configured to:
modify the numerical control programming instructions to operate the extruder during formation of the second layer to emit an amount of thermoplastic material from the nozzles of the extruder that is greater than an amount of thermoplastic material emitted from the nozzles during formation of the first layer.

4. The apparatus of claim 3, the controller being further configured to:
operate the at least one actuator to slow movement of the extruder as the extruder moves in the same direction in which the gap extends to provide additional time for thermoplastic material to fill the gap between the adjacent swaths in the first layer.

5. The apparatus of claim 3, the controller being further configured to:
operate another actuator to increase a rate at which solid extrusion material is fed into a heater operatively connected to the extruder as the extruder moves in the same direction in which the gap extends to provide additional thermoplastic material to fill the gap between the adjacent swaths in the first layer.

6. The apparatus of claim 3, the controller being configured to:
modify the numerical control programming instructions to move the extruder during formation of the swaths in the second layer to form the second layer as a solid layer over the first layer.

7. The apparatus of claim 3, the controller being configured to:
move the extruder in a first direction to form the plurality of swaths in the first layer; and
modify the numerical control programming instructions to move the extruder in the first direction during formation of the swaths in the second layer.

8. The apparatus of claim 4, the controller being further configured to:
operate a heater to heat thermoplastic material before forming the swaths in the second layer that fill the gaps in the first layer.

9. The apparatus of claim 8 wherein the heater is external to the extruder and the controller operates the heater to direct heat toward the swaths on either side of a gap.

10. The apparatus of claim 8 wherein the heater is configured to heat thermoplastic material within the extruder and the controller operates the heater to heat the thermoplastic material in the extruder to a temperature that is higher than a temperature of the thermoplastic material emitted from the nozzles of the extruder to form the swaths in the first layer.

11. The apparatus of claim 2, the controller being further configured to:
modify the numerical control programming instructions to operate the extruder to form a third layer with at least two zones of swaths separated by gaps, a longitudinal axis of the gaps in at least one zone of swaths being aligned with a longitudinal axis of the gaps in the other zone of swaths, and to form a swath connecting the at least two zones, the swath connecting the at least two zones being oriented so a longitudinal axis of the swath connecting the at least two zones is perpendicular to the longitudinal axis of the gaps in the at least two zones.

12. A method for operating an additive manufacturing system comprising:
receiving with a controller horizontal slice data for an object and numerical control programming instructions for forming the object;
modifying the numerical control programming instructions with the controller to provide interlocking swaths in adjacent layers of the object;
operating with the controller at least one actuator operatively connected to an extruder having a plurality of nozzles using the modified numerical control programming instructions to move the extruder in an X-Y plane that is parallel with a platform, to rotate the extruder about an axis perpendicular to the X-Y plane, and to change a distance between the extruder and the platform along the axis perpendicular to the X-Y plane; and
operating the extruder with the controller using the modified numerical control programming instructions to form the interlocking swaths in the adjacent layers of the object during formation of the object on the platform.

13. The method of claim 12, the modification of the numerical control programming instructions further comprising:
modifying the numerical control programming instructions with the controller so the controller operates the at least one actuator operatively connected to the extruder to move the extruder in the X-Y plane parallel to the platform opposite the extruder and operates the extruder while the extruder is being moved in the X-Y plane to form a first layer with a plurality of swaths in which adjacent swaths are separated by a gap and to form a second layer with a plurality of swaths so each swath in the plurality of swaths in the second layer extends in a same direction as the gap between adjacent swaths in the first layer and each swath in the plurality of swaths in the second layer both fills the gap separating the adjacent swaths in the first layer and overlies a portion of each portion of the adjacent swaths forming the gap.

14. The method of claim 13, the modification of the numerical programming instructions further comprising:
modifying the numerical control programming instructions with the controller so the controller operates the extruder during formation of the second layer to emit an amount of thermoplastic material from the nozzles of the extruder that is greater than an amount of thermoplastic material emitted from the nozzles during formation of the first layer.

15. The method of claim 14, the modification of the numerical programming instructions further comprising:
modifying the numerical programming instructions so the controller operates the at least one actuator to slow movement of the extruder as the extruder moves in the same direction in which the gap extends to provide time for additional thermoplastic material to fill the gap between the adjacent swaths in the first layer.

16. The method of claim 14, the modification of the numerical programming instructions further comprising:
modifying the numerical programming instructions so the controller operates another actuator to increase an amount of solid extrusion material fed into a heater operatively connected to the extruder as the extruder moves in the same direction in which the gap extends to provide additional thermoplastic material to fill the gap between the adjacent swaths in the first layer.

17. The method of claim 14, the modification of the numerical programming instructions further comprising:
modifying the numerical programming instructions so the controller moves the extruder during formation of the swaths in the second layer to form the second layer as a solid layer over the first layer.

18. The method of claim 14 further comprising:
moving the extruder in a first direction to form the plurality of swaths in the first layer; and
modifying the numerical programming instructions so the controller moves the extruder in the first direction during formation of the swaths in the second layer.

19. The method of claim 15, the modification of the numerical programming instructions further comprising:
modifying the numerical programming instructions so the controller operates a heater to heat thermoplastic material before forming the swaths in the second layer that fill the gaps in the first layer.

20. The method of claim 19, the modification of the numerical programming instructions further comprising:
modifying the numerical programming instructions so the controller operates the heater to heat the thermoplastic material in the extruder to a temperature that is higher than a temperature of the thermoplastic material emitted from the nozzles of the extruder to form the swaths in the first layer.

* * * * *